US008477765B2

(12) United States Patent
Åström et al.

(10) Patent No.: US 8,477,765 B2
(45) Date of Patent: Jul. 2, 2013

(54) METHOD AND APPARATUS FOR CORRELATING SIGNALLING IN A COMMUNICATIONS NETWORK

(75) Inventors: Bo Åström, Stockholm (SE); Carl-Henrik Hagenfeldt, Råå (SE); Alf Heidermark, Saltsjöbaden (SE); Ralf Keller, Würselen (DE); Fredrik Lindholm, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 240 days.

(21) Appl. No.: 12/746,392

(22) PCT Filed: Dec. 4, 2007

(86) PCT No.: PCT/EP2007/063317
§ 371 (c)(1),
(2), (4) Date: Jun. 4, 2010

(87) PCT Pub. No.: WO2009/071120
PCT Pub. Date: Jun. 11, 2009

(65) Prior Publication Data
US 2010/0246523 A1 Sep. 30, 2010

(51) Int. Cl.
*H04L 12/66* (2006.01)

(52) U.S. Cl.
USPC .......................................... 370/353; 370/466

(58) Field of Classification Search
USPC .................. 370/329, 437, 466, 353, 401, 392
See application file for complete search history.

(56) References Cited

U.S. PATENT DOCUMENTS

| 7,330,542 B2 * | 2/2008 | Kauhanen et al. ............ 379/229 |
| 2007/0248079 A1 | 10/2007 | Jayaram et al. | |
| 2007/0254625 A1 | 11/2007 | Edge | |

FOREIGN PATENT DOCUMENTS

WO  WO 2006/010526 A  2/2006

OTHER PUBLICATIONS

Research in Motion, Nortel: "Clarification on use of SIP for MO call" Internet Article, [Online] Nov. 12-16, 2007, pp. 1-7, XP002496969 Retrieved from the Internet: URL:http//www.3gpp.org/FTP/tsg_sa/WG2_Arch/TSGS2_61_Ljubljana/Docs/S2-075348.zip> [retrieved on Sep. 23, 2008] the whole document.
"3GPP TR 23.892 V1.4.1 IP Multimedia System (IMS) centralized services (Release 8)" Internet Article, [Online] Nov. 2007, pp. 1-160, XP002496970 Retrieved from the Internet: URL:http://www.3gpp1.net/ftp/tsg_sa/TSG_SA/TSGS_38/Docs/SP-070826.zip> [retrieved on Sep. 23, 2008] sections: 6.5.2.2.1, 6.5.2.2.2., 6.5.2.4.1. 6.62, 6.6.2b.4.1.1, 6.6.3.1.4.1, 6.7 2.4.1, 6,8a 2.4.

* cited by examiner

*Primary Examiner* — Chandrahas Patel

(57) ABSTRACT

A node in an IMS network receives circuit switched signalling relating to a communication session sent from a terminal over a circuit switched access network, and also receives packet switched signalling relating to the communication session sent from the terminal over a packet switched access network. The packet switched signalling comprises an identifier, and the node uses the identifier to correlate the circuit switched signalling with the packet switched signalling. This allows terminals using ICS to send signalling over both packet switched and circuit switched access networks, and a receiving node to correlate those signals.

8 Claims, 4 Drawing Sheets

METHOD AND APPARATUS FOR CORRELATING SIGNALLING IN A COMMUNICATIONS NETWORK

TECHNICAL FIELD

The invention relates to the field of communications networks, and in particular to the field of IP Multimedia Subsystem Centralized Services networks.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session. As the number of basic applications, and the media which it is possible to combine, increases, so will the number of services offered to the end users, giving rise to a new generation of personalised, rich multimedia communication services. The IMS is defined in the 3GPP Specification 23.228.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS 3 fits into the mobile network architecture in the case of a GPRS/PS access network. As shown in FIG. 1 control of communications occurs at three layers (or planes). The lowest layer is the Connectivity Layer 1, also referred to as the bearer, or traffic plane and through which signals are directed to/from user terminals accessing the network. The GPRS network includes various GPRS Support Nodes (GSNs) 2a, 2b. A gateway GPRS support node (GGSN) 2a acts as an interface between the GPRS backbone network and other networks (radio network and the IMS network). A Serving GPRS Support Node (SGSN) 2b keeps track of the location of an individual Mobile Terminal and performs security functions and access control. Access to the IMS 3 by IMS subscribers is performed through an IP-Connectivity Access Network (IP-CAN). In FIG. 1 the IP-CAN is a GPRS network including entities linking the user equipment to the IMS 3 via the connectivity layer 1.

The IMS 3 includes a core network 3a, which operates over the Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5. The CSCFs 5 include Serving CSCFs (S-CSCF) and Proxy CSCFs (P-CSCF), which operate as SIP proxies within the IMS in the middle, Control Layer.

At the top is the Application Layer 6, which includes the IMS service network 3b. Application Servers (ASs) 7 are provided for implementing IMS service functionality. Application Servers 7 provide services to end-users on a session-by-session basis, and may be connected as an end-point to a single user, or "linked in" to a session between two or more users. Certain Application Servers 7 will perform actions dependent upon subscriber identities (either the called or calling subscriber, whichever is "owned" by the network controlling the Application Server 7).

IMS relies on Internet Protocol (IP) as a transport technology. Using IP for voice communications, however, presents some challenges, especially in the mobile community where Voice Over IP (VoIP) enabled packet switched (PS) bearers may not always be available. To allow operators to start offering IMS-based services while voice enabled PS-bearers are being built out, the industry has developed solutions that use existing Circuit Switched (CS) networks to access IMS services. These solutions are referred to as IMS Centralized Services (ICS). ICS is also the name of the Work Item in 3GPP Release 8 addressing these matters.

Currently, ICS contains three alternative solutions known as I1-CS, I1-PS and "N-ICS". N-ICS is a solution in which the network implements an adaptation function between a Global System for Mobile Communications (GSM) terminal and the IMS system. The terminal is not required to have any special functionality, but the CS network requires an update with new functionality in Mobile Switching Centres (MSC)/Visitor Location Registers (VLRs).

I1-CS and I1-PS both require ICS functionality in an accessing terminal. The CS network is on the other hand unaffected and transparent to the communication taking place between the ICS capable terminal and an IMS network. IMS CS Control Protocol (ICCP) is a control protocol standardized in 3GPP to allow an ICS capable terminal to communicate with service implementations in an IMS network when a CS network is used as a transport network. It is used for mid-call signalling for services such as call hold and call waiting. Unstructured Supplementary Services Data (USSD) carries the ICCP protocol transparently from an ICS terminal through the CS network to an "IMS-Adapter" that translates ICCP into SIP. The IMS-Adapter is a new functional entity in the IMS network, termed an IMS CS Control Function (ICCF).

A difference between I1-CS and I1-PS is that I1-PS uses SIP signalling over a PS access network for all ICS related signalling. This includes mid-call manipulations (for example hold/retrieve, Explicit Call Transfer), the addition of non-speech media to an existing call, IMS Registration, and so on. I1-CS, on the other hand, uses the CS (ICCP over USSD) access network for some purposes such as mid-call manipulations but not for other actions such as IMS Registration, the addition of media to calls, and multiparty calls.

FIG. 2 herein illustrates signalling principles for the I1-CS solution. A terminal 8 is shown that connects to an IMS network 3 via a PS access network 9 and a CS access network 10. Signalling from both access networks traverses an ICCF 11 in the IMS network 3. For both I1-CS and I1-PS, the PS access network 9 is either not suitable for, or not allowed to carry speech (shown as limited capability in FIG. 2), but suitable for SIP signalling. If the signalling takes place simultaneously with a CS voice call, Dual Transfer Mode (DTM) capabilities (the ability to have PS and CS bearers simultaneously in 2G (GSM/EDGE)) are required.

The two different signalling sessions shown in FIG. 2 relate to the same call and should be presented to a remote end (another terminal) as a single session. A problem with dividing signalling over two protocols and access networks is that it can be difficult to correlate each set of signals to one another. Nodes within the IMS network should be able to match signalling sent over a PS access network with signalling sent over a CS access network when the two sets of signalling relate to the same communication or session.

SUMMARY

According to a first aspect of the invention, there is provided a method for correlating signalling in a communications network. A node in an IMS network receives circuit switched signalling relating to a communication session sent from a terminal over a circuit switched access network, and also receives packet switched signalling relating to the communication session sent from the terminal over a packet switched access network. The packet switched signalling comprises an identifier, and the node uses the identifier to correlate the circuit switched signalling with the packet switched signalling. This allows terminals using ICS to send signalling over both packet switched and circuit switched access networks, and a receiving node to correlate those signals. By "circuit switched signalling", and "packet switched signalling", it is meant signalling sent over a circuit switched or a packet switched network respectively.

As an option, after establishing the communication session over the circuit switched access network, the identifier is sent from the node to the terminal. The identifier is then included in all subsequent packet switched signalling relating to the communication session. This allows an identifier to be allocated for each communication session, which allows the terminal to be able to participate in more than one communication session at a time. The identifier is optionally sent to the terminal in response to a request received from the terminal.

Alternatively, the identifier comprises a value and the terminal's Mobile Subscriber ISDN E.164 number. The identifier is therefore unique to the terminal and generated by the terminal, which simplifies signalling, but means that the terminal can only be involved in one communication session that requires packet switched and circuit switched signalling to be correlated.

There are several ways in which the identifier can be sent from the terminal to the node. These include including the identifier in a Feature Tag sent in Session Initiation Protocol packet switched signalling, including the identifier in a body of Session Initiation Protocol packet switched signalling, and included the identifier as a Public Service Identity router to the node in the IMS network.

In the case where the identifier is a combination of a value and the terminal's Mobile Subscriber ISDN, the value is optionally included in a Feature Tag sent in Session Initiation Protocol packet switched signalling, and the terminal's Mobile Subscriber ISDN is included in a P-Asserted Id.

Optionally, the identifier is correlated with Unstructured Supplementary Services Data dialogue in the circuit switched signalling.

According to a second aspect of the invention, there is provided a mobile terminal for use in a communications network. The terminal comprises means for sending, to a node in an IP Multimedia Subsystem network, circuit switched signalling relating to a communication session over a circuit switched access network. The terminal further comprises means for sending, to the node in the IP Multimedia Subsystem network, packet switched signalling relating to the communication session over a packet switched access network. The packet switched signalling comprising an identifier for use in correlating the packet switched signalling with the circuit switched signalling. This has the advantage that the receiving node can use the identifier to correlate the circuit switched signalling with the packet switched signalling.

Optionally, the terminal comprises a receiver for receiving an identifier from the node in the IP Multimedia Subsystem network. This allows an identifier to be allocated for each communication session. Alternatively, the terminal comprises means for generating the identifier, the identifier comprising a value and the terminal's Mobile Subscriber ISDN E.164 number. This simplifies signalling, but only allows the terminal to participate in one communications session that involves both packet switched and circuit switched signalling at a time.

According to a third aspect of the invention, there is provided an IP Multimedia Subsystem CS Control Function node for use in a communications network. The node comprises means for receiving circuit switched signalling relating to a communication session sent from a terminal over a circuit switched access network, and means for receiving packet switched signalling relating to the communication session sent from the terminal over a packet switched access network. The packet switched signalling comprises an identifier, which the node uses to correlate the circuit switched signalling with the packet switched signalling.

Optionally, the node further comprises means for generating the identifier, and a transmitter for sending the identifier to the terminal. This allows an identifier to be allocated for each communication session, allowing the terminal to participate in more than one ICS communication session at a time.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

Figure 1:
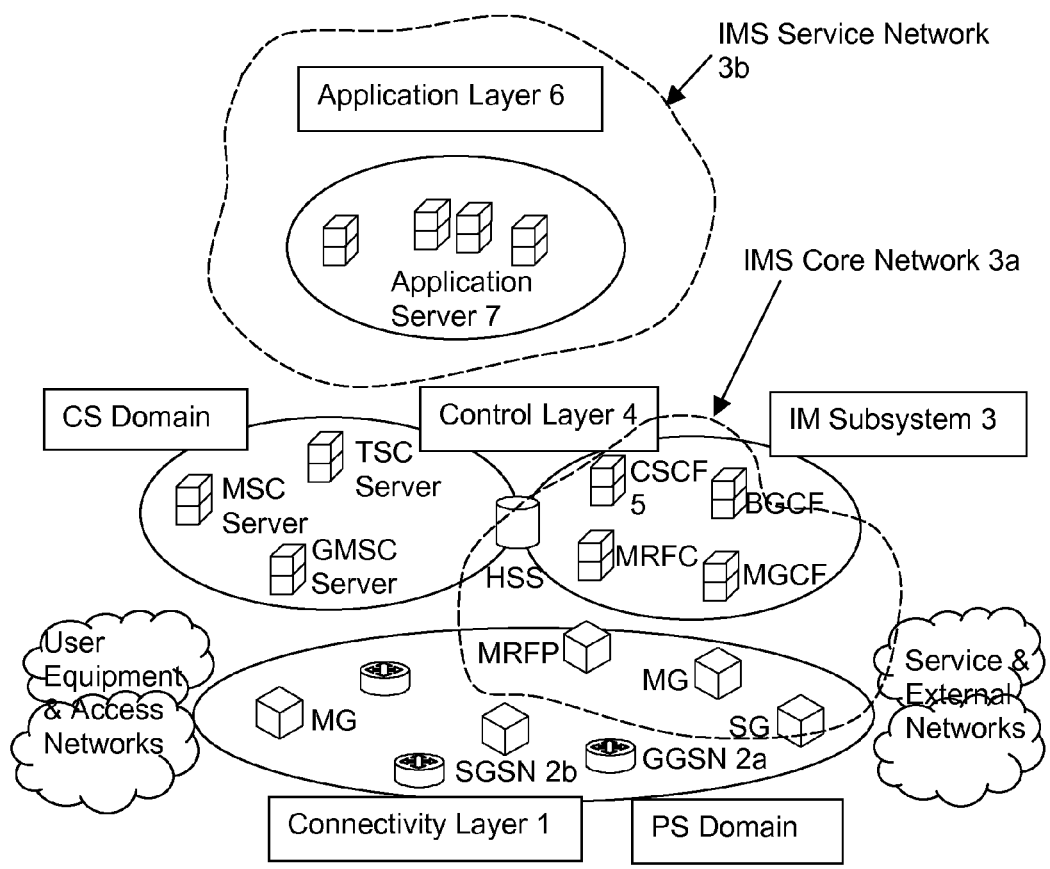
FIG. 1 illustrates schematically in a block diagram how an IMS network fits into the mobile network architecture in the case of a GPRS/PS access network.
Figure 2:
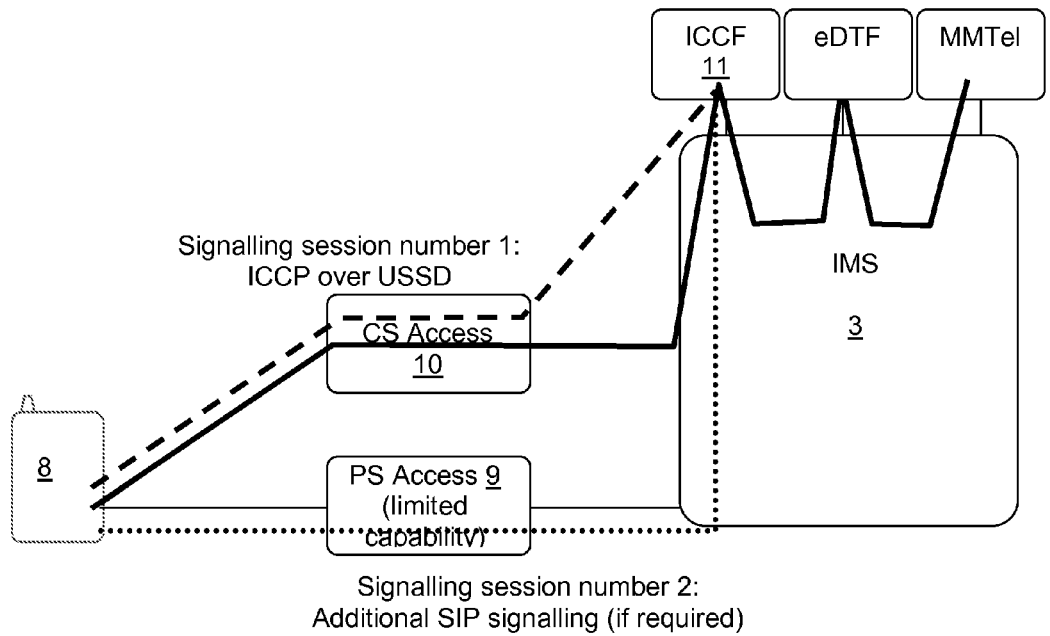
FIG. 2 illustrates schematically in a block diagram signalling principles I1-CS.
Figure 3:
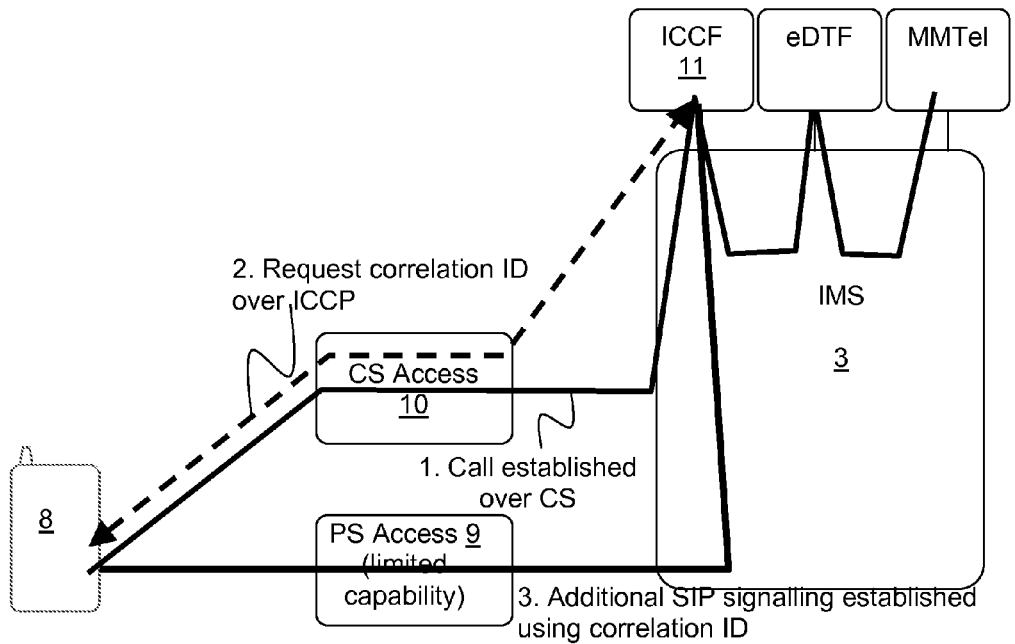
FIG. 3 illustrates schematically in a block diagram signalling principles according to an embodiment of the invention.

Referring to FIG. 3, a communications network comprises an ICS terminal 8, a PS access network 9, a CS access network 10, an IMS network 3, and an ICCF 11 located in the IMS network 3. In a high level embodiment of the invention, the terminal 8 includes an identifier in all PS signalling that it sends. The identifier allows nodes within the IMS network 3 to correlate the PS signalling with the terminal or with a particular session with which the terminal is involved.

Once a call has been established over the CS access network, an identifier (termed a PS correlation id) is sent from the ICCF 11 to the terminal 8. Where the ICCF 11 allocates the identifier, it may be allocated from a pool of numbers and may additionally be time-stamped. Alternatively, the terminal

8 generates its own identifier. Any additional SIP signalling sent from the terminal relating to the call includes the identifier.

Figure 4:
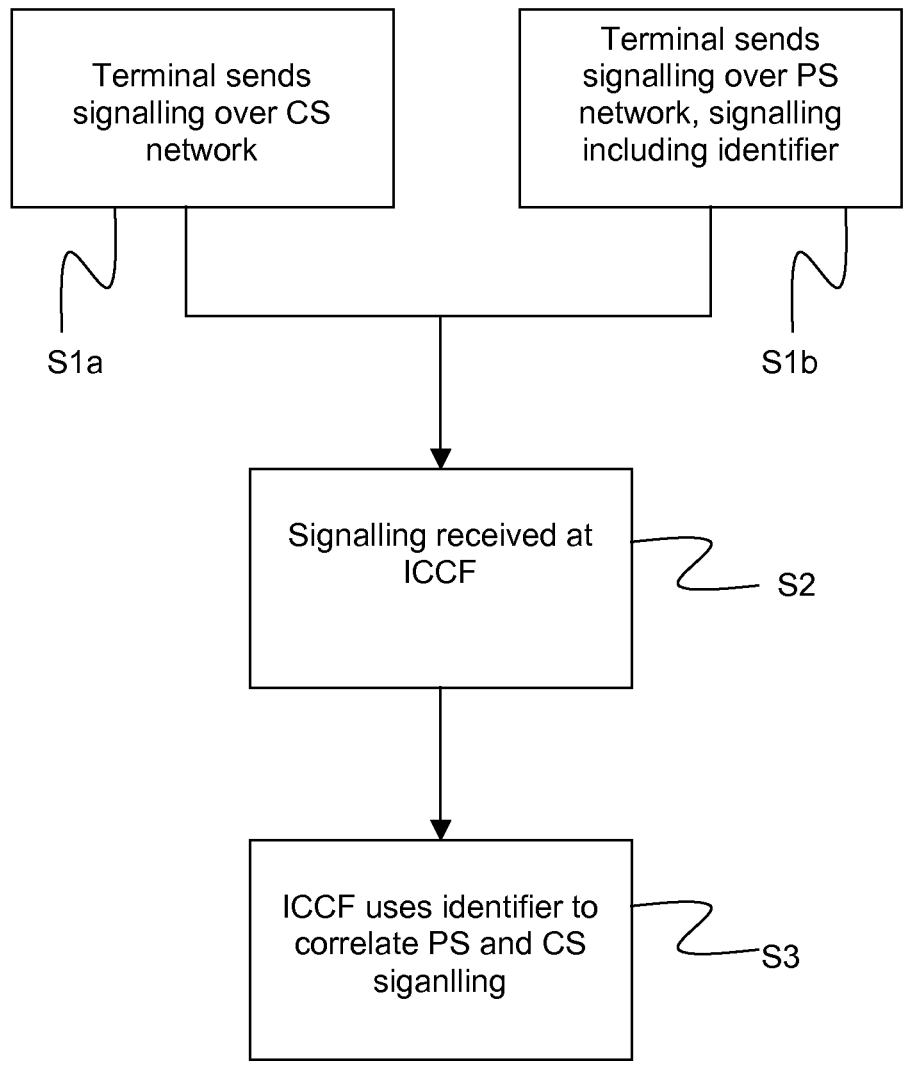
FIG. 4 is a flow diagram showing the basic steps of an embodiment of the invention.

FIG. 4 is a flow diagram illustrating the basic steps of the invention. In step S1a, the terminal 8 sends signalling relating to a call over a CS network, and also (as shown in step S1b) sends signalling over a PS network. The signalling sent over the PS network comprises the identifier. When the signalling is received S2 at the ICCF 11, the ICCF uses the identifier to correlate S3 the signalling sent over the PS network with the signalling sent over the CS network.

There are different ways in which the identifier can be obtained by the terminal and subsequently sent. According to a first embodiment, it is possible to establish both originating and terminating ICS calls at the terminal without ICCP signalling. ICCP is used when required for the established call, for example for mid call services such as call hold and call waiting. Additional SIP signalling is used when required, for example for adding media to a CS call transferred over PS. In order to avoid unnecessary signalling, an identifier is only provided to the terminal when signalling over the PS network is required. The identifier is then included in all subsequent SIP signalling over the PS access network. When the ICCF receives a SIP message with the previously assigned identifier, it knows which call the SIP signalling is intended for.

Once the identifier has been obtained by the terminal, it is transferred to the ICCF in all subsequent signalling over PS. The following are examples of ways in which the identifier can be transferred over the PS access network:
1. Included in a Feature Tag, for example: +gics.PS-Correlation-Id."value-of-the-assigned-Correlation-Id";
2. In an XML defined body in the SIP message;
3. Used as a Public Service Identity (PSI) to route to the ICCF.

Initial filter Criteria (IFC) triggering on the originating side (S-CSCF) is used for alternatives 1 and 2 to invoke the ICCF functional entity over the ISC interface, and allow the ICCF to correlate the CS and PS signalling procedures with each other. The B-Number of the recipient used to establish the CS call can be used as a Request-URI for the SIP signalling over PS. In alternative 3, the identifier must be in the form of a PSI to be routable in the IMS network, either directly from an I-CSCF to the ICCF or via an S-CSCF.

A PSI is an identification of a service in a network that is used to "call the service", i.e. similar to dialling, for example, an 800 number in a PSTN. PSI identification is also used in the ICS solution for the "handover phase" of a call between CS and PS access networks, where a Voice Call Continuity Domain Transfer URI (VDI) is used as a PSI. However, when VDI is used as a PSI, it is an order to the Domain Transfer Function (DTF) to transfer the call from IMS to CS. The identifier, on the other hand, is only used to tie CS and PS signalling sessions to each other, when a call using the CS access network is already established at the ICCF. When the PSI option is used, the PSI is placed in the Request-URI of the SIP message transferred over PS.

This solution allows several calls to co-exist, as identifiers are dynamically assigned to each call or session that the terminal is involved in.

According to a second embodiment of the invention, a simplified option is to allow the terminal to participate in only one call at a time, and assign a static identifier to each ICS terminal. This value needs to be qualified with the Mobile Subscriber ISDN (MSISDN) of the ICS terminal in order for it to be unique.

The identifier can be transferred to the ICCF in any of the following ways:
1. Included in a Feature Tag, for example: +g.ics.PS-Correlation-Id.MSISDN;
2. Included in a Feature Tag with the MSISDN transported in the P-Asserted Id;
3. In an XML defined body in the SIP message together with an MSISDN;
4. As a PSI to route to the ICCF, where the last part of the PSI is the calling subscriber's MSISDN or in the P-Asserted Id.

As with the first embodiment, IFC triggering on the originating side (S-CSCF) is used for alternatives 1-3. The B-Number of the recipient used to establish the CS call can be used as a Request-URI for the SIP signalling over the PS network.

For option 4, the identifier must in this case be in the form of a PSI to be routable in the IMS network, either directly from an I-CSCF to the ICCF or via an S-CSCF. The principle is similar to how a VDI is used in ICS, but the meaning is different. When VDI is used as a PSI, it is an order to the DTF (Domain Transfer Function) to transfer the call from IMS to CS. The identifier, on the other hand, is only used to tie CS and PS signalling sessions to each other. When the PSI option is used, the PSI is placed in the Request-URI of the SIP message transferred over PS.

Figure 5:
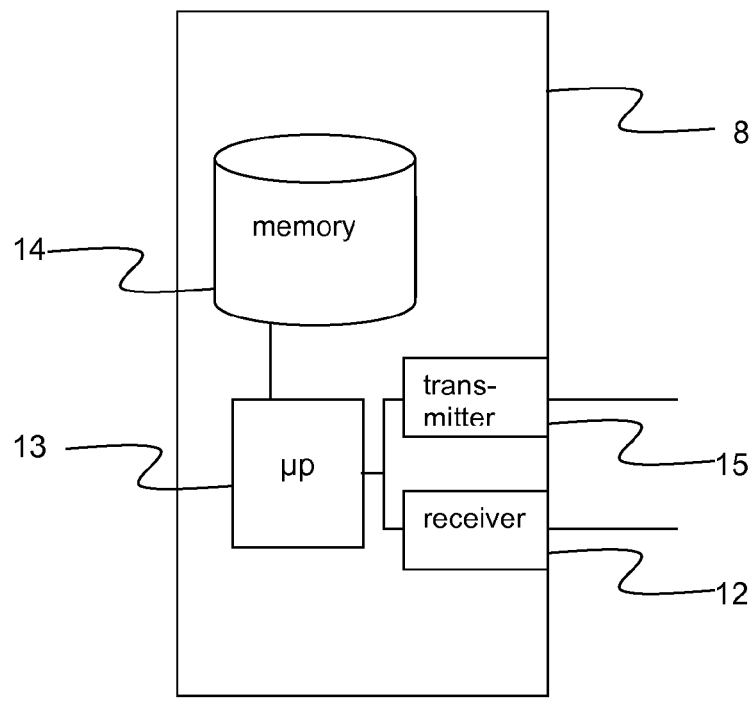
FIG. 5 illustrates schematically in a block diagram a mobile terminal according to an embodiment of the invention.

Referring to FIG. 5, there is illustrated a terminal 8. The terminal 8 comprises a receiver 12 for receiving signals. The terminal also comprises a processor 13 for including an identifier in SIP signalling sent to an ICCF. A memory 14 may be provided in order for the terminal to retain the identifier. The terminal further comprises a transmitter 15 for sending SIP signalling to an ICCF, the SIP signalling comprising the identifier.

Figure 6:
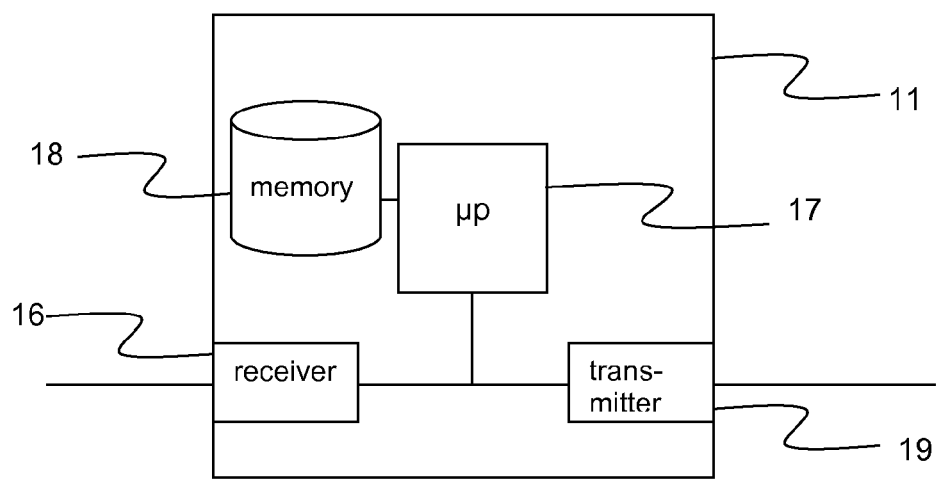
FIG. 6 illustrates schematically in a block diagram an IP Multimedia Subsystem CS Control Function according to an embodiment of the invention.

Referring to FIG. 6, there is illustrated an ICCF 11 according to an embodiment of the invention. The ICCF comprises a receiver 16 for receiving SIP signalling from a terminal, the SIP signalling comprising an identifier. The ICCF further comprises a processor 17 for correlating the identifier in the SIP signalling with ICCP signalling performed over USSD via the CS network. The ICCF comprises a memory 18 for storing the data mapping identifiers to CS signalling. According to one embodiment, the ICCFG further comprises a transmitter 19 for sending an identifier relating to a call to a terminal. In this case, the processor may also be used to generate the identifier.

The invention makes it possible to correlate two separate signalling sessions where one signalling session is established over CS (ICCP/USSD) and the other over PS (SIP), where both sessions relate to the same call.

Although various embodiments have been shown and described in detail, the claims are not limited to any particular embodiment or example. None of the above description should be read as implying that any particular element, step, or function is essential such that it must be included in the claims' scope. The scope of patented subject matter is defined by the claims.

The following acronyms have been used in this specification:
24.008 3GPP layer 3 specification for the radio interface
3GPP 3rd Generation Partnership Project
CAMEL Customized Applications for Mobile network Enhanced Logic
CAP CAMEL Application Part—a signalling protocol used with CAMEL
CS Circuit Switched
DTF Domain Transfer Function
DTM Dual Transfer Mode
eDTF enhanced Domain Transfer Function
gsmSCF GSM Service Control Function I1-cs MS CS Control Channel implemented over the CS domain
I1-ps IMS CS Control Channel implemented over the PS domain
IA IMS Adaptor
ICCF IMS CS Control Function
ICCP IMS CS Control Protocol
ICS IMS Centralized Services accessed over CS
IDP Initial Detection Point (CAMEL)
IMS IP Multimedia Subsystem
IN Intelligent Networks
MAP Mobile Application Part—a signalling protocol
MGFC Media Gateway Control Function
MMI Man-Machine Interface
MSISDN Mobile Subscriber ISDN (E.164 number)
PS Packet Switched
PSI Public Service Identity
SIP Session Initiation Protocol
TEL Telephony
UE User Equipment
URI Uniform Resource Identifier
USSD Unstructured Supplementary Services Data
VDI VCC Domain Transfer URI (VDI)

The invention claimed is:

1. A method for correlating signalling in a communications network, the method comprising:
   at a node in an Internet Protocol Multimedia Subsystem network, receiving circuit switched signalling relating to a communication session sent from a terminal over a circuit switched access network;
   after establishing the communication session over the circuit switched access network, receiving from the terminal a request for an identifier;
   sending the identifier from the node to the terminal, where the identifier is from a pool of numbers and the identifier is time-stamped;
   receiving packet switched signalling relating to the communication session sent from the terminal over a packet switched access network, the packet switched signalling comprising the identifier; and
   using the identifier to correlate the circuit switched signalling with the packet switched signalling.

2. The method according to claim 1, wherein the identifier is included in a Feature Tag sent in Session Initiation Protocol packet switched signalling.

3. The method according to claim 1, wherein the identifier is included in a body of Session Initiation Protocol packet switched signalling.

4. The method according to claim 1, wherein the identifier is included as a Public Service Identity router to the node in the Internet Protocol Multimedia Subsystem network.

5. The method according to claim 1, wherein the identifier is correlated with Unstructured Supplementary Services Data dialogue in the circuit switched signalling.

6. The method according to claim 1, further comprising including the identifier in all subsequent packet switched signalling relating to the communication session.

7. A mobile terminal for use in a communications Network, the terminal comprising:
   means for sending to a node in an Internet Protocol Multimedia Subsystem network, circuit switched signalling relating to a communication session over a circuit switched access network;
   means for sending to the node, after establishing the communication session over the circuit switched access network, a request for an identifier;
   a receiver for receiving the identifier from the node in the Internet Protocol Multimedia Subsystem network, where the identifier is from a pool of numbers and the identifier is time-stamped; and
   transmitter means for sending, to the node in the Internet Protocol Multimedia Subsystem network, packet switched signalling relating to the communication session over a packet switched access network, the packet switched signalling comprising the identifier for use in correlating the packet switched signalling with the circuit switched signalling.

8. An IP Multimedia Subsystem Circuit Switched Control Function node for use in a communications network, the node comprising:
   means for receiving circuit switched signalling relating to a communication session sent from a terminal over a circuit switched access network;
   means for receiving from the terminal a request for an identifier, the identifier being received after establishing the communication session over the circuit switched access network;
   means for generating the identifier, where the identifier is from a pool of numbers and the identifier is time-stamped; and
   a transmitter for sending the identifier to the terminal;
   receiver means for receiving packet switched signalling relating to the communication session sent from the terminal over a packet switched access network, the packet switched signalling comprising the identifier;
   processor means for correlating the circuit switched signalling with the packet switched signalling using the identifier.

* * * * *

UNITED STATES PATENT AND TRADEMARK OFFICE
CERTIFICATE OF CORRECTION

| | |
|---|---|
| PATENT NO. | : 8,477,765 B2 |
| APPLICATION NO. | : 12/746392 |
| DATED | : July 2, 2013 |
| INVENTOR(S) | : Aström et al. |

It is certified that error appears in the above-identified patent and that said Letters Patent is hereby corrected as shown below:

In the Claims

In Column 8, Line 7, in Claim 7, delete "communications Network," and insert -- communications network, --, therefor.

Signed and Sealed this
Fifth Day of November, 2013

Teresa Stanek Rea
*Deputy Director of the United States Patent and Trademark Office*